US009092681B2

(12) United States Patent
Havens et al.

(10) Patent No.: US 9,092,681 B2
(45) Date of Patent: Jul. 28, 2015

(54) LASER SCANNING MODULE EMPLOYING A LASER SCANNING ASSEMBLY HAVING ELASTOMERIC WHEEL HINGES

(71) Applicant: Hand Held Products, Inc., Fort Mill, SC (US)

(72) Inventors: William H. Havens, Syracuse, NY (US); Gregory Rueblinger, Stratford, NJ (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 14/154,915

(22) Filed: Jan. 14, 2014

(65) Prior Publication Data

US 2014/0197239 A1    Jul. 17, 2014

Related U.S. Application Data

(60) Provisional application No. 61/752,088, filed on Jan. 14, 2013.

(51) Int. Cl.
*G06K 7/10* (2006.01)

(52) U.S. Cl.
CPC .................................. *G06K 7/10623* (2013.01)

(58) Field of Classification Search
CPC ....................................................... G02B 15/14
USPC ........................................................... 235/454
See application file for complete search history.

(56) References Cited

U.S. PATENT DOCUMENTS

| 5,097,355 | A | * | 3/1992 | Eden | 359/213.1 |
| 5,340,971 | A | | 8/1994 | Rockstein et al. | |
| 8,294,969 | B2 | * | 10/2012 | Plesko | 359/200.7 |

* cited by examiner

*Primary Examiner* — Jamara Franklin
(74) *Attorney, Agent, or Firm* — Additon, Higgins & Pendleton, P.A.

(57) ABSTRACT

A laser scanning module employs a scan mirror and magnet rotor subassembly supported by a stator structure using a pair of elastomeric wheel hinges. The scan mirror and magnet rotor subassembly includes: a scan mirror and magnet rotor subassembly having a rotor frame having a pair of rotor support posts aligned along a scan axis passing through the rotor frame; a scan mirror mounted on the rotor frame; and a permanent magnet mounted on the rotor frame. The elastomeric wheel hinge includes a central portion having an aperture for passage and fixed attachment of one rotor support post, a plurality of elastomeric spoke portions extending from the central portion and radially extending from the central aperture to a circumferential rim portion connected to the outer end portion of each spoke portion so as to form the elastomeric wheel hinge.

19 Claims, 9 Drawing Sheets

LASER SCANNING MODULE EMPLOYING A LASER SCANNING ASSEMBLY HAVING ELASTOMERIC WHEEL HINGES

CROSS-REFERENCE TO RELATED APPLICATION

The present application claims the benefit of U.S. Patent Application No. 61/752,088 for a Laser Scanning Module Employing a Laser Scanning Assembly Having Elastomeric Wheel Hinges filed Jan. 14, 2013, which is hereby incorporated by reference in its entirety.

BACKGROUND OF DISCLOSURE

1. Field of Disclosure

The present disclosure relates to improvements in laser scanning modules, and more particularly to improvements in laser scanning assemblies employed therein.

2. Brief Description of the State of the Art

The use of laser scanning bar code symbol reading engines is well known in the art. Applications include: hand-held products; reverse-vending machines; and the like.

Currently, various types of laser scanning mechanisms have been developed for scanning laser beams across bar code symbols. Such laser scanning mechanisms include shaft-based laser scanning mechanisms; hinge-based laser scanning mechanisms; torsional-based laser scanning mechanisms; and flipper-based laser scanning mechanisms.

Conventional shaft-based scanning mechanisms suffer from a number of shortcomings and drawbacks. In particular, prior art shaft-based scanning assemblies suffer from friction-related uncertainty and reliability problems. When using a magnet to generate the return force, the resonant laser scanning system becomes unstable when subjected to excessive external forces.

Conventional silicone hinge-based laser scanning assemblies suffer the fact that when subjected to high G forces, additional motion limiters are required to prevent excessive motion.

Also, while conventional torsional-based laser scanning mechanisms provide an alternative way of supporting a laser scanning subassembly, conventional structures have been difficult to manufacture, and lack sufficient ruggedness required in most modern laser scanning applications.

Thus, there is great need in the art for new and improved laser scanning assemblies, which avoid the shortcomings and drawbacks of the prior art scanning methods and apparatus

OBJECTS AND SUMMARY

A primary object of the present disclosure is to provide a new and improved laser scanning element and module, which overcomes the shortcomings and drawbacks of the prior art laser scanning methods and apparatus.

Another object is to provide a torsion-based laser scanning assembly employing a silicone spring structure similar to that of watch spring can be used, offering the advantage of being easy to mold and very strong along the axis perpendicular to the axis of rotation.

Another object is to provide an improved torsion-based laser scanning assembly employing a silicone frame having two silicone wheel springs, spaced apart in parallel planes, and supporting a rotor subassembly about the ends of its rotor shaft so that a scan mirror and a permanent magnet supported on the rotor frame are rotated about a scan axis passing through the rotor shaft when the permanent magnet is driven by an electromagnetic coil structure in close proximity to the permanent magnet, thereby creating a scanning motion similar to that supported by conventional shaft-based laser scanning mechanisms.

Another object is to provide an improved torsion-based laser scanning assembly, wherein a pair of silicone wheel springs function as a stationary stator structure that is secured to the scanning engine chassis/housing, and used to support (i.e. hold) the scan mirror and magnet rotor subassembly at a minimal distance from the electromagnetic coil structure, to allow lower levels of electrical current to drive the electromagnet coil structure and rotate the scan mirror and magnet rotor subassembly about its virtual axis of rotation, in an energy-efficient manner.

Another object is to provide an improved torsion-based laser scanning module employing a silicone torsion-based laser scanning assembly having a scan mirror and magnet rotor subassembly rotatably supported by a stationary stator structure utilizing a pair of spaced-apart silicone spring wheels, mounted to the scanning engine housing or chassis.

Another object is to provide an improved torsion-based laser scanning assembly that allows the scanning mirror and permanent magnet mount to be made from solid plastic material, while the restoring forces are generated by a pair of silicone spring-wheels supporting the scanning mirror and magnet rotor subassembly relative to a stationary stator structure contained within a housing.

Another object is to provide a laser scanning module that can be used to replace conventional shaft-based laser scanning engines, with an improved silicone torsional-based laser scanning module that consumes less electrical power, and eliminates friction uncertainty related jams, and high-power consumption problems.

Another object of the present invention is to provide a new and improved silicone torsion-based laser scanning module (i.e. engine) that allows easy integration into all laser scanning products, while minimizing the space requirements for such integration.

These and other objects will become apparent hereinafter and in the Claims.

BRIEF DESCRIPTION OF THE DRAWINGS

In order to more fully understand the objects, the following detailed description of the illustrative embodiments should be read in conjunction with the accompanying drawings in which.

DETAILED DESCRIPTION OF THE ILLUSTRATIVE EMBODIMENTS

Referring to the figures in the accompanying drawings, the various illustrative embodiments of the present invention will be described in greater detail, wherein like elements will be indicated using like reference numerals.

Figure 1:
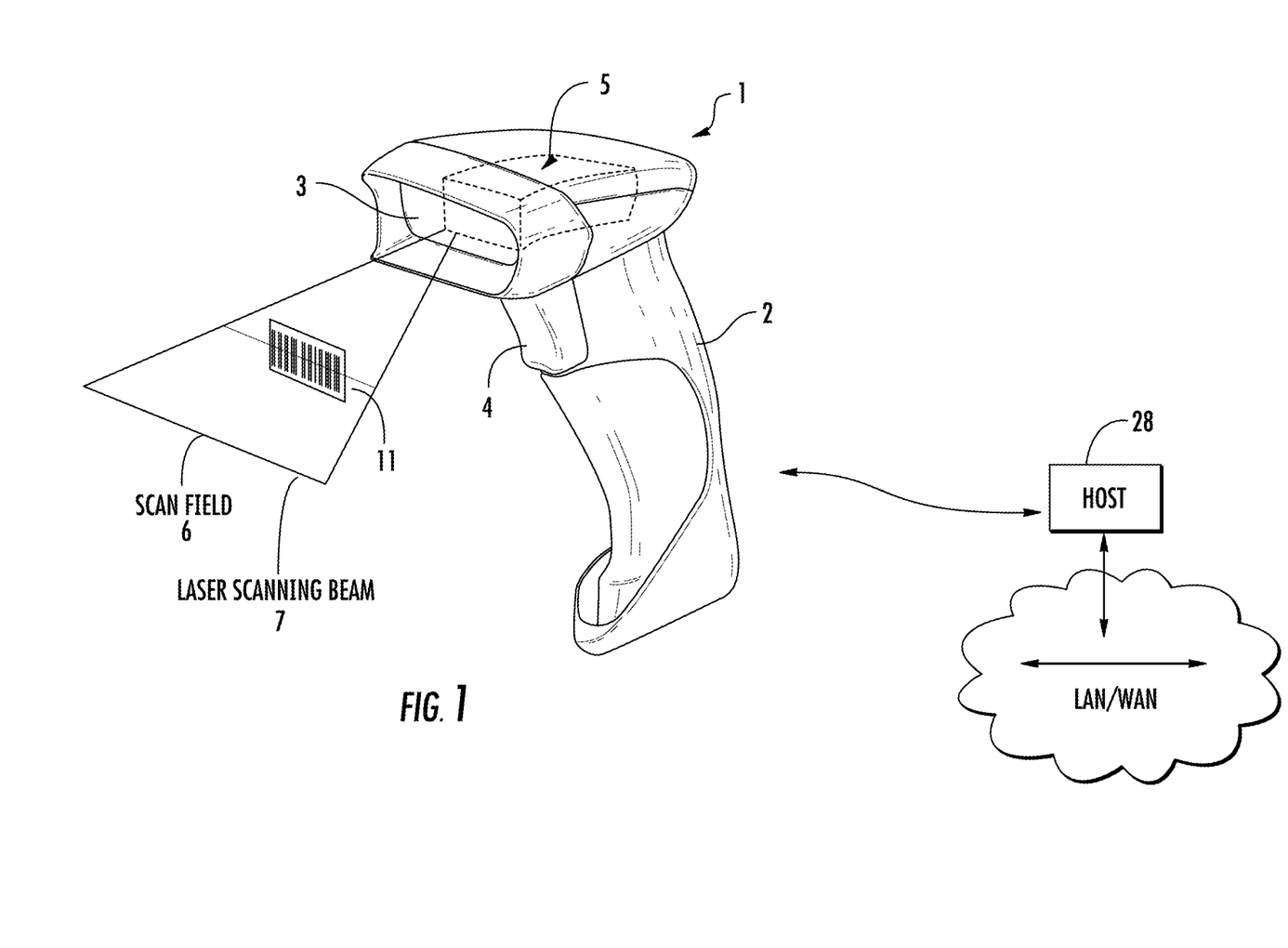
FIG. 1 is a hand-supportable laser scanning bar code symbol reading system, incorporating any one of the laser scanning modules of the illustrative embodiments of the present disclosure.

The laser scanning module (i.e. engine) 5 is intended for use in diverse kinds of laser scanning bar code symbol reading systems including, but not limited to, the hand-supportable laser scanning system 1 shown in FIG. 1. However, it is understood that the laser scanning module 5 can be installed in other types of laser scanning systems, other than hand-supportable systems, such as POS-projection, countertop, and industrial type laser scanning systems.

Figure 3:
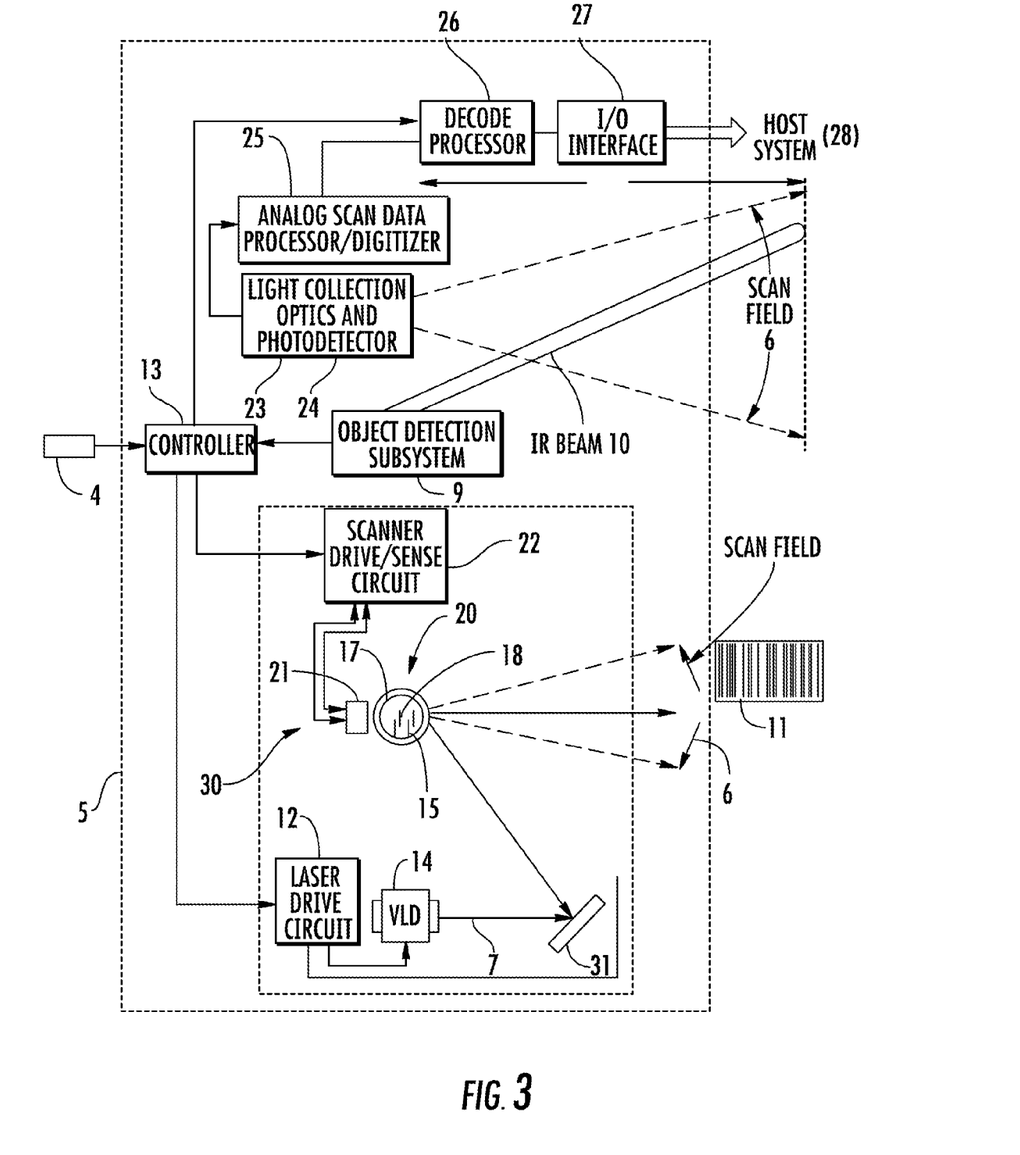
FIG. 3 is a schematic block diagram showing the system components employed in the laser scanning bar code symbol reading system of FIG. 1A, including the laser scanning engine of the illustrative embodiment.

As shown in FIGS. 1 and 3, the laser scanning bar code symbol reading system 1 comprises: a hand-supportable housing 2 having a head portion and a handle portion supporting the head portion; a light transmission window 3 integrated with the head portion of the housing 2; a manually-actuated trigger switch 4 for activating laser scanning module (or engine) 5 supporting a laser scanning field 6 by swept laser beam 7; and optionally, an IR-based object detection subsystem 9 for generating an IR beam 10 within the laser scanning field 6, as shown in FIG. 1, for automatically detecting an object supporting a bar code 11 in the laser scanning field 6, and generating a trigger event signal in response thereto.

Figure 2A:
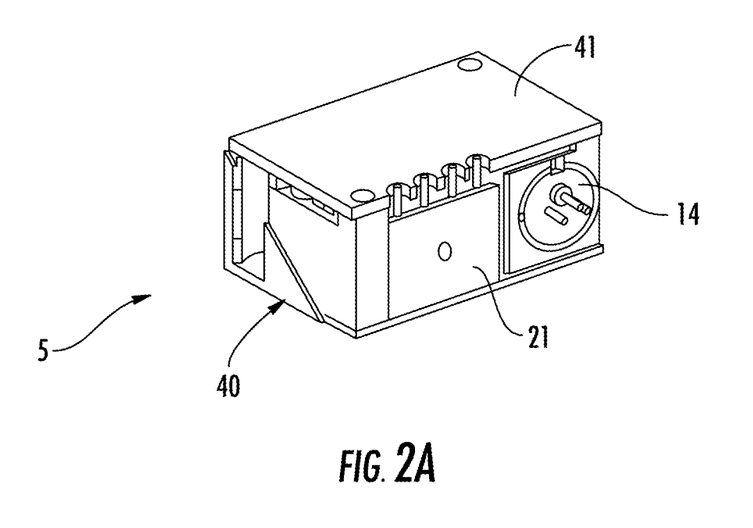
FIG. 2A is a first perspective view of the illustrative embodiment of the laser scanning module according to present disclosure, employing a silicone-based torsional wheel-hinge scanning assembly.
Figure 2B:
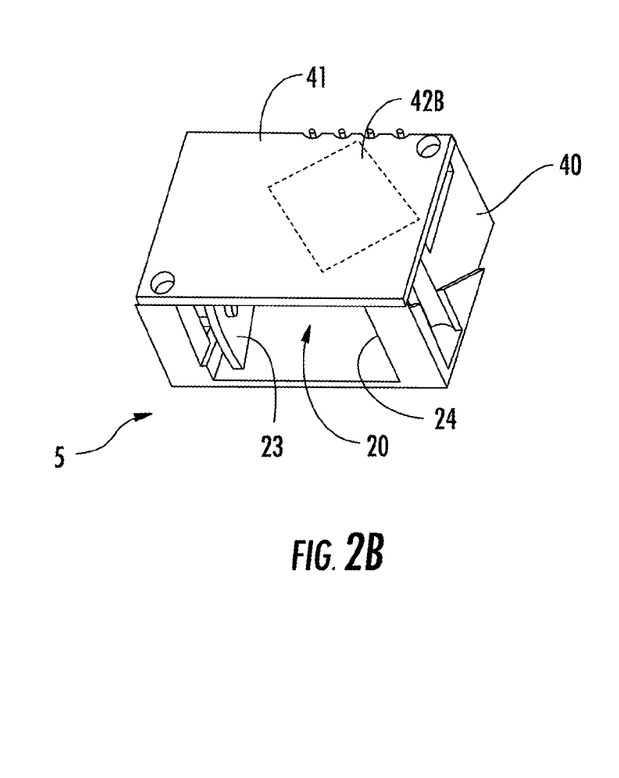
FIG. 2B is a second perspective view of the laser scanning module of the illustrative embodiment.
Figure 2C:
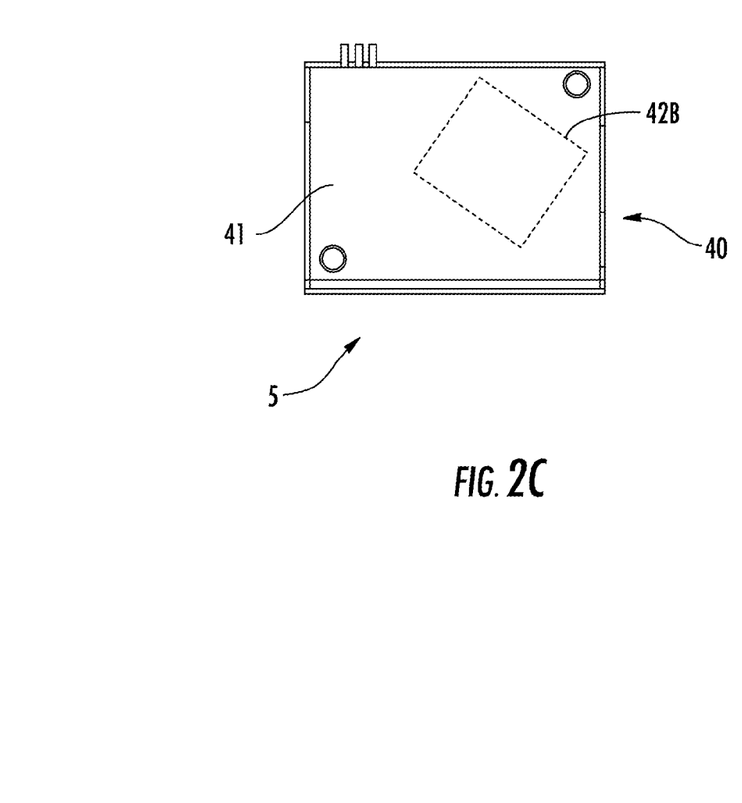
FIG. 2C is a plan view of the laser scanning module of the illustrative embodiment.

FIGS. 2A, 2B and 2C show the laser scanning module 5 removed from hand-supportable housing 2, and revealing its housing framework 40, having a bottom surface 40A (not shown), side walls, and PC board 41 attached to the top open side to close off the framework and form the module housing.

As shown in FIGS. 2A, 2B and 2C and 4, the laser scanning module 5 comprises: an engine housing or framework 40 having multiple sides, namely opposing sides, a front side with a light transmission aperture, and opposing rear side, a bottom side and opposing top side; a laser scanning assembly 20 mounted within the engine housing for generating and scanning a laser scanning beam across a laser scanning field 6 adjacent the light transmission aperture; an electromagnetic coil structure 21 mounted in the engine housing 40, for generating an electromagnetic force field to interact with a permanent magnet 17 aboard the laser scanning assembly 20; and at least one PC board 41, mounted on at least one side of the module housing, and having one or more electronic circuits formed thereon implementing the functions of the various subsystems described in the system block diagram shown in FIG. 3.

Figure 4:
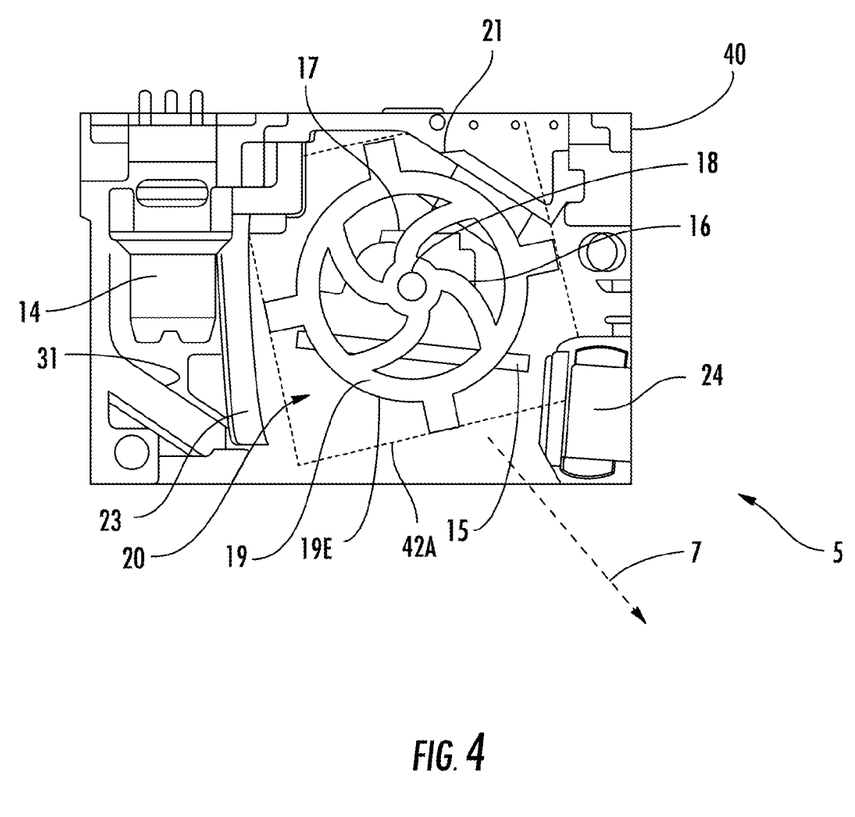
FIG. 4 is a plan view of the laser scanning module of the illustrative embodiment, with its top printed circuit (PC) board removed, revealing the silicone-based torsional wheel-hinge scanning assembly mounted within the engine housing.

As shown in FIGS. 3 and 4, laser scanning assembly 20 comprises: a scan mirror and magnet rotor subassembly 16 having a pair of silicone wheels 19 and 19'; rotor 16 having posts 16A and 16B supported by silicone wheels 19 and 19, respectively, and supporting scanning mirror 15 and the permanent magnet 17 so that the scanning mirror 15 and the magnet 17 are free to rotate about a scan axis 18 passing through rotor posts 16A and 16B.

Figure 5:
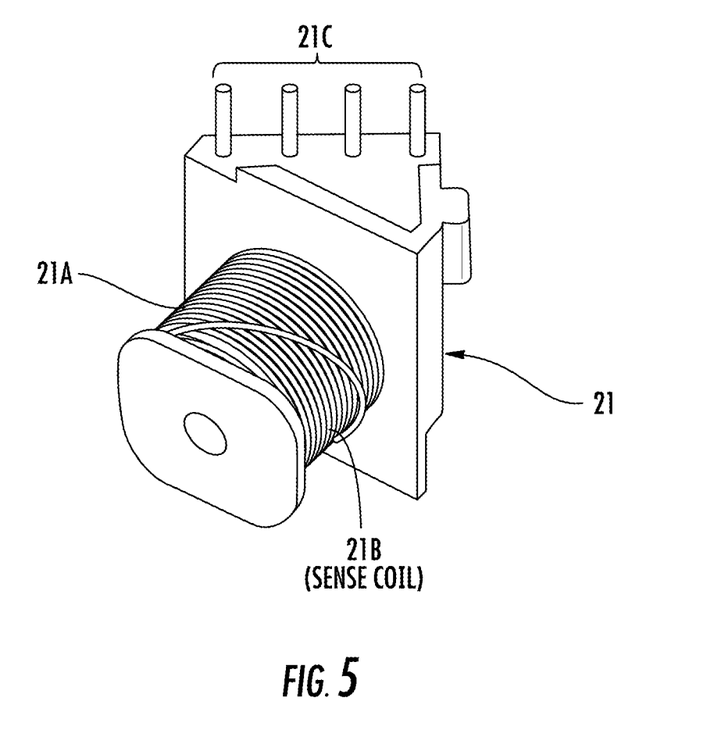
FIG. 5 is a perspective view of the electromagnetic coil structure employed in the laser scanning module shown in FIGS. 4A through 4C.

As shown in FIG. 5, the electromagnetic coil structure 21 is mounted within the module housing on the rear side of the laser scanning assembly. The electromagnetic coil structure 21 has a plurality of electrically conductive pins connected to its coil windings, which are driven by scanner drive and sense circuits 22 shown in FIG. 3. The function of the electromagnetic coil 21 is to exert electromagnetic forces on the permanent magnet 17 retained in the scan mirror and magnet rotor subassembly 20, and cause the scan mirror and magnetic rotor subassembly 20 to oscillate about its scan axis 18 (from its home position shown in FIG. 9A), and sweep the laser scanning beam 7 across the laser scanning field 5.

In the illustrative embodiment shown in FIG. 5, the electromagnetic coil support structure 21 has the shape of a bobbin, formed by a pail of parallel flanges extending from a cylindrical portion. About the cylindrical portion, a primary drive coil 21A is wound and terminated in a first pair of electrically-conductive pins. Also, a sense coil 21B is wound about the electromagnetic coil support structure and terminated in a second pair of electrically-conductive pins. As shown in FIG. 5, the first and second sets of electrically conductive pins 21C are arranged in a linear array, but may be arranged in a different configuration, in different illustrative embodiments, as may be required or desired.

As shown in FIG. 3, the laser scanning module 5 further comprises a number of components mounted within the module housing 40, namely: a laser drive circuit 12 for receiving control signals from system controller 13, and in response thereto, generating and delivering laser (diode) drive current signals to a laser source 14 having beam shaping optics to produce a laser scanning beam 7 which is repeatedly scanned across the laser scanning field 6 by the silicone wheel scanning assembly 20; light collection optics 23 (e.g. light collection mirror with an aperture for passage of laser beam 7 from VLD 14) for collecting light reflected/scattered from scanned object in the laser scanning field 6, and a photo-detector 24 for detecting the intensity of collected light and generating an analog scan data signal corresponding to the detected light intensity during scanning operations; and a beam deflecting mirror 31 for deflecting the laser beam 7 from its source 14, as incident beam towards the mirror component of the laser scanning assembly, which sweeps the deflected laser beam across the laser scanning field 6 and a bar code symbol 11 that might be simultaneously present therein during system operation.

As shown in FIG. 3, the laser scanning module 5 further comprises a number of circuits realized on PC board 41, namely: an analog scan data signal processor/digitizer 25 for (i) processing the analog scan data signals, (ii) converting the processed analog scan data signals into digital scan data signals, and then (iii) converting these digital scan data signals into digital words representative of the relative width of the bars and spaces in the scanned code symbol structure; a programmed decode processor 26 for decode processing digitized data signals, and generating symbol character data representative of each bar code symbol scanned by either a visible or invisible laser scanning beam; an input/output (I/O) communication interface module 27 for interfacing with a host communication system and transmitting symbol character data thereto via wired or wireless communication links that are supported by the symbol reader and host system 28; and system (micro)controller 13 for generating the necessary control signals for controlling operations within the laser scanning bar code symbol reading system 1. Notably, components 9, 13, 23, 24, 25, 26, and 27 can be realized on PC board 41 or other circuit boards, integrated with the laser scanning module 5, or on external PC boards interfaced with module 5 using a flexible ribbon cable, in a manner well known in the art.

Preferably, IR-based object detection subsystem 9 is mounted in the front of its light transmission window 3 so that the IR light transmitter and IR light receiver components of subsystem 9 have an unobstructed view of an object within the laser scanning field of the system, as shown in FIG. 1. Also, the IR object presence detection module 9 can transmit into the scanning field 6, IR signals having a continuous low-intensity output level, or having a pulsed higher-intensity output level, which may be used under some conditions to increase the object detection range of the system. In alternative embodiments, the IR light transmitter and IR light receiver components can be realized as visible light (e.g. red light) transmitter and visible light (e.g. red light) receiver components, respectively, well known in the art. Typically the object detecting light beam will be modulated and synchronously detected, as taught in U.S. Pat. No. 5,340,971, incorporated herein by reference.

Depending on the application, the object detection subsystem 6 or the manually-actuated trigger switch 4 and related circuitry, can be enabled for the purpose of generating a trigger event signal and supporting either a manually-triggered mode of operation, or an automatically-triggered mode of operation, as required by the end-user application at hand.

Referring to FIGS. 6 through 8B, the laser scanning assembly 20 will be described in greater technical detail. As shown, rotor frame 16 employed in laser scanning assembly 20 is typically made from a thermoplastic, and has a number of structural features, namely: rigid support posts 16A and 16B extending from the rotor frame and aligned along scan axis 18; a mirror mounting surface 16C on the front portion of the rotor frame for mounting scanning mirror 15; and a magnet mounting surface 16D on the rear portion of the rotor frame for mounting permanent magnet 17.

Figure 6:
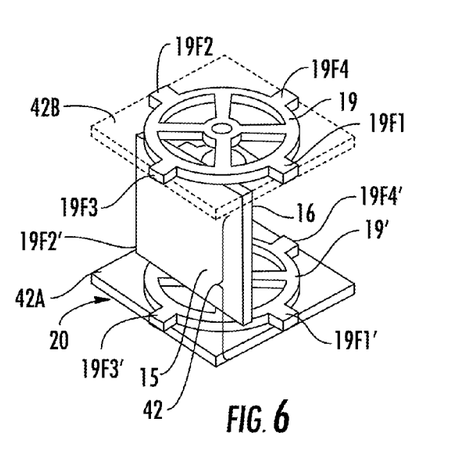
FIG. 6 is a perspective view of the silicone-based torsional wheel-hinge scanning assembly removed from the engine housing, and without its electromagnetic coil structure.
Figures 7A, 8B:
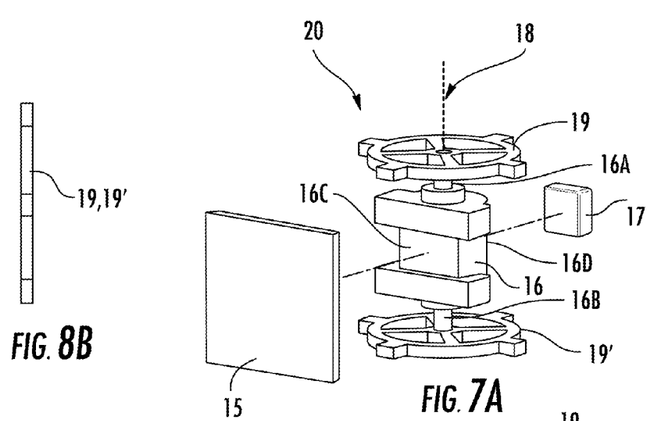
FIG. 7A is a first partially exploded view of the silicone-based torsional wheel-hinge scanning assembly of FIG. 6, showing its scanning mirror and permanent magnet exploded away from the rotor structure.
FIG. 8B is a side view of a silicone-based torsional wheel hinge employed in the silicone-based torsional wheel-hinge scanning assembly of FIG. 7.
Figure 7B:
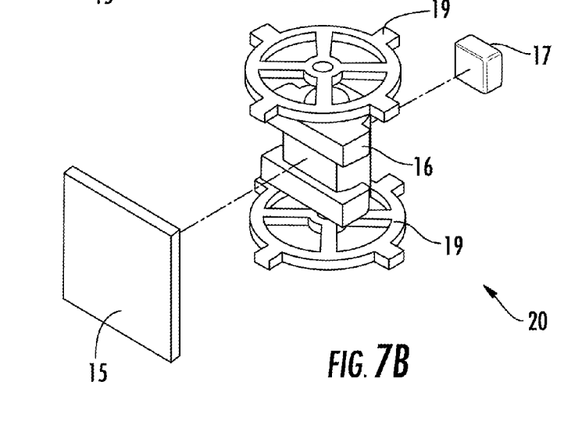
FIG. 7B is a second partially exploded view of the silicone-based torsional wheel-hinge scanning assembly of FIG. 6, showing its scanning mirror and permanent magnet exploded away from the rotor structure.
Figure 8A:
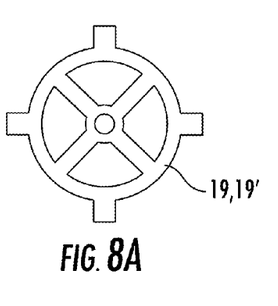
FIG. 8A is a plan view of a silicone-based torsional wheel hinge employed in the silicone-based torsional wheel-hinge scanning assembly of FIG. 7.
Figure 9A:
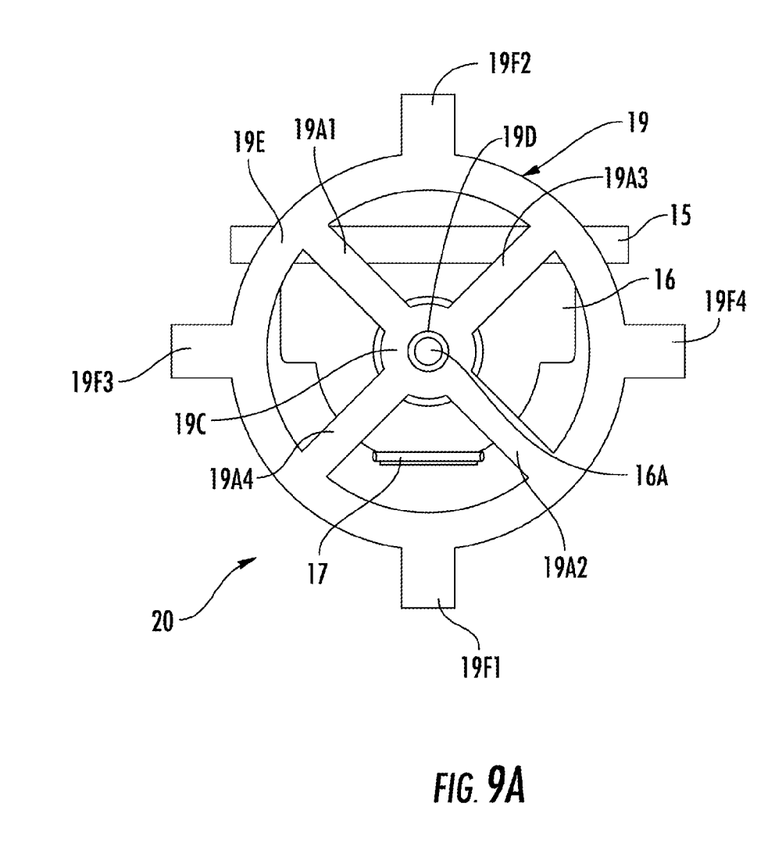
FIG. 9A is a plan view of the silicone-based torsional wheel-hinge scanning assembly of FIG. 6, shown in a non-torsionally distorted state.

As shown in FIG. 9A, upper silicone wheel hinge 19 comprises: a central portion 19C, having an aperture 19D, for passage and fixed attachment of rotor shaft 16A; four silicone spoke portions 19A1, 19A2, 19A3 and 19A4 extending from the central portion 19C, and extending radially from central aperture 19D to a circumferential rim portion 19E connected to the outer end portion of each spoke portion 19A1, 19A2, 19A3 and 19A4, so as to form the silicone wheel hinge 19, as shown in FIGS. 8A and 8B. As shown in FIG. 6, wheel support projections 19F1, 19F2, 19F3 and 19F4 extend from the rim portion 19E at equal angular distances.

Figure 9B:
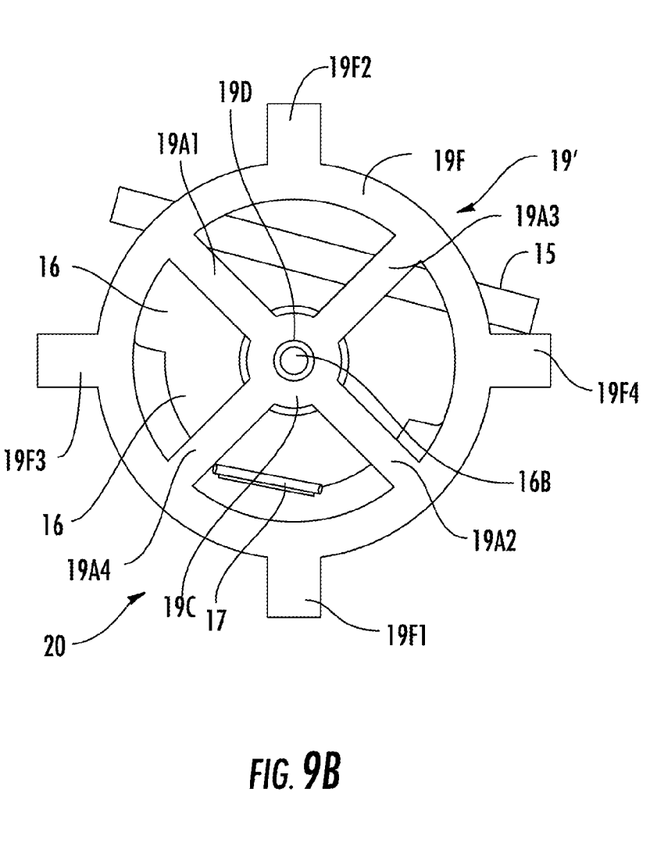
FIG. 9B is a plan view of the silicone-based torsional wheel-hinge scanning assembly of FIG. 6, shown in a torsionally distorted state.

As shown in FIG. 9B, lower silicone wheel hinge 19' also comprises: a central portion 19C', having an aperture 19D', for passage and fixed attachment of rotor shaft 16A; four silicone spoke portions 19A1', 19A2', 19A3' and 19A4' extending from the central portion 19C', and extending radially from central aperture 19D' to a circumferential rim portion 19E' connected to the outer end portion of each spoke portion 19A1', 19A2', 19A3' and 19A4', so as to form the silicone wheel hinge 19', as shown in FIGS. 8A and 8B. As shown in FIG. 6, wheel support projections 19F1', 19F2', 19F3' and 19F4' extend from the rim portion 19E' at equal angular distances.

As shown in FIGS. 2B, 2C, 4 and 6, a stationary frame holder (i.e. stator structure) 42 is provided for supporting silicone wheel hinges 19 and 19' in a spaced apart relationship within the engine housing 40. As best shown in FIG. 6, the stationary frame holder 42 comprises a pair of spaced apart wheel support plates 42A and 42B, supported in spaced apart parallel manner, to form a stator framework embedded within the module housing 40. In the illustrative embodiment, the lower wheel support plate 42A is mounted on the bottom surface of the engine housing 40, as shown in FIG. 4 and has four recesses which receive and hold securely wheel projections 19F1', 19F2', 19F3' and 19F4'.

Similarly, the upper wheel support plate 42B is mounted on the top surface of the engine housing 40, as shown in FIGS. 2B and 2C and has four recesses which receive and hold securely wheel projections 19F1, 19F2, 19F3 and 19F4. When configured, the stationary frame holder (i.e. stator structure) comprising wheel support plates 42A and 42B should not block the optical pathways of the scanning mirror 15 or the laser scanning beam 7 during laser scanning operations.

As show in FIG. 7A, the rotor frame 16 has a pair of posts 16A and 16B which integrally extend from the body of the frame structure 16 and are aligned along the scan axis 18 of the scanning assembly 20. As shown in FIGS. 9A, 9B, 7A through 7E, a silicone scan mirror and magnet (i.e. rotor) frame 16 comprises: a pair of rigid posts 16A and 16B aligned along a scan axis 18 passing through the silicone frame 36; a first side 16C for mounting a scan mirror 15; and a second side 16D for mounting a permanent magnet 17.

As shown in FIGS. 4, 6, 7A and 7B, the scan mirror 15 is mounted on the first side of the rotor frame 16A by a first layer of adhesive. The permanent magnet 17 is mounted on said second side of the rotor frame 16B using a second layer of adhesive. In the illustrative embodiment, the cross-sectional dimensions of the posts 16A and 16B are circular, but can be rectangular or other regular or irregular geometrical shapes, as may be required or desired, for a particular application. Also, in the illustrative embodiment, the first side 16C and the second side 16D of the rotor frame reside on the opposite sides of the scan axis 18 passing through the silicone frame 16.

FIG. 9A shows the spoke portions of the silicone wheel hinges 19, 19' arranged in a non-torsionally distorted state. In contrast, FIG. 9B shows the spoke portions of the silicone wheel hinges 19, 19' arranged in a torsionally-distorted state. In this distorted state, the spokes 19A1 through 19A4 undergo elastically-deformation when the electromagnet coil 21 drives the rotor 16 away from its home position, as shown in FIG. 9B, to its extreme scanning position shown in FIG. 9B, and therewhile generates elastic returning force causing the scan mirror and magnet rotor subassembly 16 to return to its home position shown in FIG. 9A. When configured between these two extreme rotational positions, shown in FIGS. 9A and 9B, the silicone wheel hinges 19 and 19' are elastically distorted, and generate restoring or returning forces that are generally linear with respect to the angle of rotation of the rotor assembly.

All components of the laser scanning assembly, except for the magnet 17, elastomeric wheel hinges 19 and 19', and electromagnetic coil windings 21, can be a molded as thermoplastic parts using suitable thermoplastic material (e.g. polycarbonate, acrylonitrile butadiene styrene, and/or synthetic polymers known generically as polyamides, etc). The permanent magnet 17 can be realized using Neodymium Iron Boron Type N50 magnetic material, or similar material. The elastomeric wheel hinges 19, 19' can be injection molded from a LSR (Liquid Silicone Rubber) material, such as Momentive Performance #2030 Silicone or Shin-Etsu KE2090-30AB Silicone Elastomer. The durometer of the silicone elaster selected will depend upon the desire resonant frequency for the mechanical system. The layer of adhesive can be a Dow Corning 734 adhesive, or similar material, and the primer layer could be a GE SS4004P or similar material.

Specification of Laser Scanning System during Scanning Operation

In general, system 1 supports both an automatic-triggered mode of operation and a manually-triggered mode of operation. During either mode of operation, a triggering event signal is generated (e.g. by object detector 9 or by manual trigger switch 4). In response thereto, the laser scanning module 5 generates and projects a laser scanning beam through the light transmission window 3, and across the laser scanning field 6, and any object present therein. The laser scanning assembly 20 repeatedly scans the laser beam 7 across the object and any code symbol 11 residing thereon in the laser scanning field 6.

In the torsion-based laser scanning assembly 20 described above, the pair of silicone wheel hinges 19 and 19' are spaced apart in parallel planes, and support the rotor subassembly 16 about the ends of its rotor shaft 16A, 16B so that scan mirror 15 and a permanent magnet 17 are rotated about scan axis 18 passing through the rotor shaft when the permanent magnet 17 is driven by electromagnetic coil structure 21 in close proximity therewith. This creates a scanning motion similar to that supported by conventional shaft-based laser scanning mechanisms. Also, during each laser scanning cycle, the silicone wheel hinges 19, 19' provide a spring function (i.e. restoring forces) causing the scan mirror and magnet rotor subassembly 16 to automatically return its home position, shown in FIG. 9A, after each scanning rotation shown in FIG. 9B, in an energy-efficient manner.

The light collection optics 23, 24 collects light reflected/scattered from scanned code symbols on the object in the scanning field. The photo-detector 24 automatically detects the intensity of collected light (i.e. photonic energy) and generates an analog scan data signal corresponding to the light intensity detected during scanning operations. The analog scan data signal processor/digitizer 25 processes these analog scan data signals, converts the processed analog scan data signals into digitized data signals, and then converts the digital data signals into digital words, for the decode processor 26.

The programmed decode processor 26 then decode processes the digital words, and generates symbol character data representative of each bar code symbol scanned by laser scanning beam. Symbol character data corresponding to the bar codes read by the decoder 26 is then transmitted to the host system via the I/O communication interface 27 which may support either a wired and/or wireless communication link, well known in the art. During laser scanning operations, the system controller 13 generates the necessary control signals for controlling operations within the laser scanning bar code symbol reading system 1.

Figure 10:
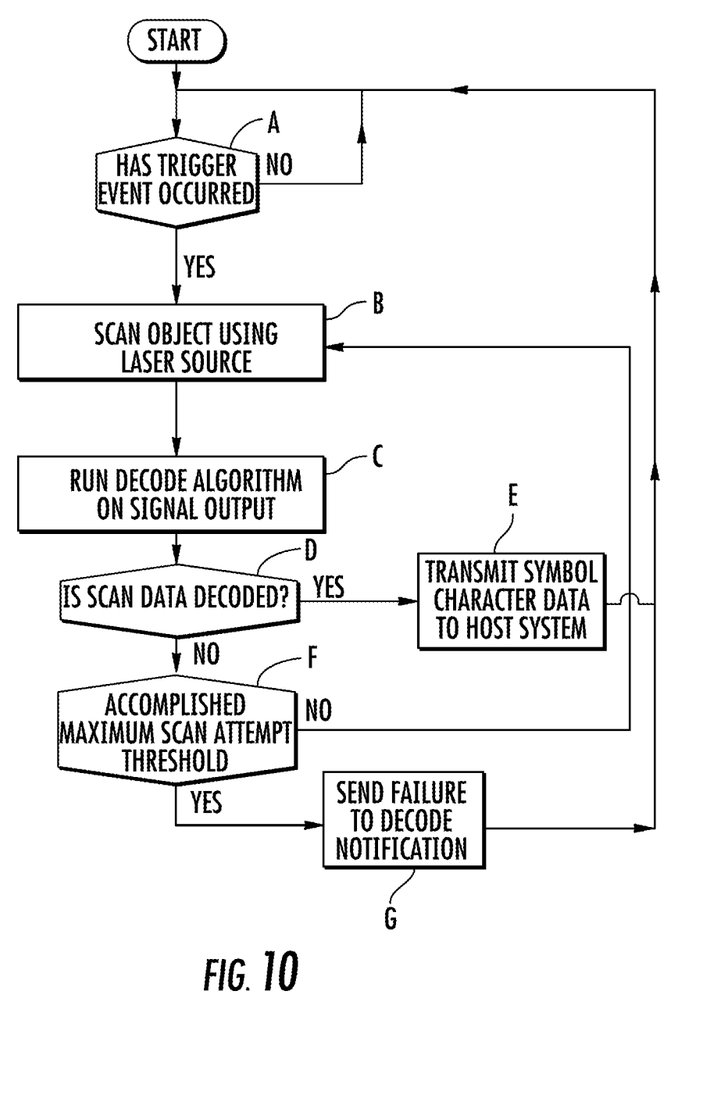
FIG. 10 sets forth a flow chart describing the major steps performed during the operation of the laser scanning bar code symbol reading system of FIG. 1.

Referring to FIG. 10, a method of reading bar code symbols and controlling operations within the laser scanning bar code reading system 1 will be described in greater detail below.

As indicated in FIG. 10, the process orchestrated by the system controller 13 begins at the START Block. Then at Block A in FIG. 3, the system controller determines if a trigger event has occurred (i.e. whether or not trigger signal has been manually generated by trigger 4, or automatically produced by IR detection subsystem 9). In the event that a trigger event has been detected at Block A, then at Block B the system controller 13 directs the laser scanning module 5 to scan the detected object with a laser beam generated by the VLD 14. If not, the system resides at Block A waiting for a trigger event signal.

At Block C in FIG. 10, the decode processor 26 runs a decode algorithm on the captured scan data, and if at Block D, a bar code symbol is decoded, then at Block E, the produced symbol character data is transmitted to the host system, and the system controller returns to Block A. If, however, at Block D a bar code symbol is not decoded, then the system controller 13 determines at Block F whether or not the maximum scan attempt threshold has been reached, and if not, then the system controller 13 returns to Block B, and resumes the flow as indicated.

However, if at Block F in FIG. 10, the system controller 16 determines that the maximum scan attempt threshold has been accomplished, then the system controller 13 proceeds to Block G and sends a Failure to Decode notification to the operator and returns to Block A. In some instances, block G may not be required and no Failure to Decode notice would be sent.

In the illustrative embodiments, the laser scanning modules has been shown to have the form factor of parallel-piped shaped engines, where opposite sides are generally parallel to each other. It is understood, however, that in alternative embodiments, the laser scanning module of the present disclosure can have non-parallel-piped form factors (e.g. cylindrical-shaped, drum shaped, oval-shaped, arbitrary-shaped 3D modules). Also, the laser scanning assemblies of the present disclosure can be installed in all kinds of code symbol reading systems without the use of module or engine housings, and can be realized directly on optical benches, PC boards, and numerous other environments.

It is understood that the laser scanning assembly of the illustrative embodiments may be modified in a variety of ways which will become readily apparent to those skilled in the art in view of the novel teachings disclosed herein. All such modifications and variations of the illustrative embodiments thereof shall be deemed to be within the scope of the Claims appended hereto.

The invention claimed is:

1. A laser scanning assembly for a module housing, comprising:
   a scan mirror and magnet rotor subassembly comprising:
      a rotor frame having a pair of rotor support posts aligned along a scan axis passing through the rotor frame;
      a scan mirror mounted on the rotor frame; and
      a magnet mounted on the rotor frame;
   a pair of elastomeric wheel hinges torsionally supporting the scan mirror and magnet rotor subassembly such that the scan mirror and magnet rotor subassembly oscillate freely about the scan axis, wherein each elastomeric wheel hinge comprises: (i) a central portion having an aperture for passage and fixed attachment of one of the rotor support posts; (ii) a plurality of elastomeric spoke portions extending from the central portion and radially extending from the aperture; and (iii) a circumferential rim portion connected to an outer end portion of each spoke portion; and a stator structure mounted stationary relative to the module housing, comprising a pair of support members for supporting each of the elastomeric wheel hinges.

2. The laser scanning assembly of claim 1, wherein the pair of elastomeric wheel hinges generate an elastic returning force to the scan mirror and magnet rotor subassembly.

3. The laser scanning assembly of claim 2, wherein the magnitude of the elastic returning force is linearly proportional to the magnitude of the angle of rotation of the scan mirror and magnet rotor subassembly about the scan axis.

4. The laser scanning assembly of claim 1, wherein each elastomeric wheel hinge frame is molded from a silicone material.

5. The laser scanning assembly of claim 1, wherein the silicone material is a liquid silicone rubber.

6. The laser scanning assembly of claim 1, wherein the rotor frame and the rotor support posts are made from a thermoplastic material.

7. The laser scanning assembly of claim 1, wherein the each rotor support post has a circular cross-sectional dimension or a rectangular cross-sectional dimension.

8. The laser scanning assembly of claim 1, wherein the scan mirror and the permanent magnet are mounted on opposite sides of the scan axis.

9. The laser scanning assembly of claim 1, wherein the laser scanning assembly is mounted in an engine housing of a laser scanning module.

10. The laser scanning assembly of claim 1, wherein:
the laser scanning assembly is mounted in an engine housing of a laser scanning module; and
the engine housing comprises a light transmission aperture.

11. The laser scanning assembly of claim 10, wherein said pair of said rotor support posts have a circular cross-sectional dimension or a rectangular cross-sectional dimension.

12. The laser scanning assembly of claim 1, wherein:
the laser scanning assembly is mounted in an engine housing of a laser scanning module; and
the engine housing comprises a light transmission aperture; and
the laser scanning module comprises an electromagnetic coil.

13. The laser scanning assembly of claim 12, wherein said scan mirror and said permanent magnet are mounted on opposite sides of said scan axis.

14. A laser scanning assembly for installation within a scanning system having a system housing, said laser scanning assembly comprising:
a scan mirror and magnet rotor subassembly having
(i) a rotor frame having a pair of rotor support feature for supporting elastomeric wheel hinges;
(ii) a scan mirror mounted on said rotor frame; and
(iii) a permanent magnet mounted on said rotor frame;
a pair of elastomeric wheel hinges, wherein each said elastomeric wheel hinge includes (i) a central portion having an aperture for passage and fixed attachment of one said rotor support features, (ii) a plurality of elastomeric spoke portions extending from said central portion and radially extending from said central aperture to a circumferential rim portion connected to the outer end portion of each said spoke portion so as to form said elastomeric wheel hinge; and
a stator structure mounted stationary relative to said housing, and including one or more support features for supporting each said elastomeric wheel hinges, so that said pair of elastomeric wheel hinges torsionally support said scan mirror and magnet rotor subassembly and allow said scan mirror and magnet rotor assembly to oscillate freely about said scan axis passing through said rotor frame.

15. The laser scanning assembly of claim 14, wherein said pair of elastomeric wheel hinges generates an elastic returning force to said scan mirror and magnet rotor subassembly.

16. The laser scanning assembly of claim 15, wherein the magnitude of said elastic returning force is linearly proportional to the magnitude of the angle of rotation of said scan mirror and magnet rotor subassembly about said scan axis.

17. The laser scanning assembly of claim 14, wherein each said elastomeric wheel hinge frame is molded from a silicone material.

18. The laser scanning assembly of claim 14, wherein said silicone material is a liquid silicone rubber.

19. The laser scanning assembly of claim 14, wherein said rotor frame and said are made from a thermoplastic material.

* * * * *